LE ROY B. CARRIS.
RESILIENT WHEEL.
APPLICATION FILED MAR. 15, 1916.
1,229,412.
Patented June 12, 1917.
2 SHEETS—SHEET 2.
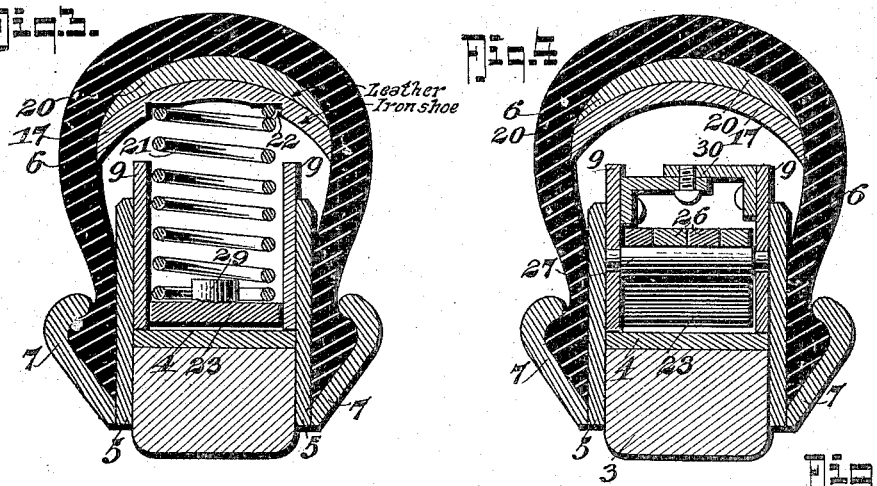
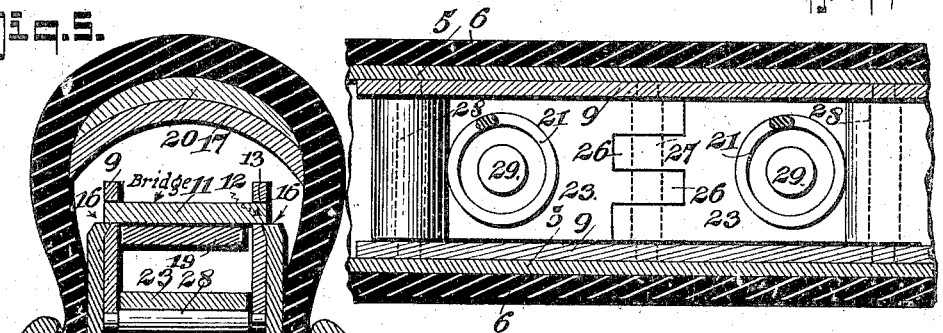
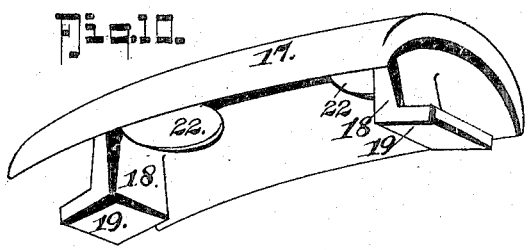
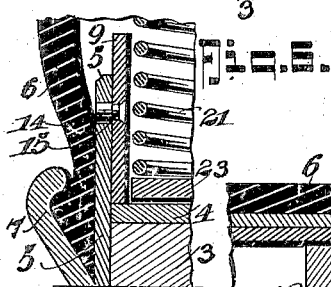
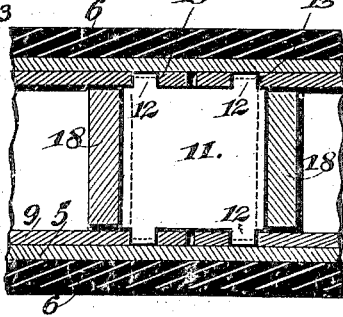
INVENTOR
Le Roy B. Carris
BY
ATTORNEYS

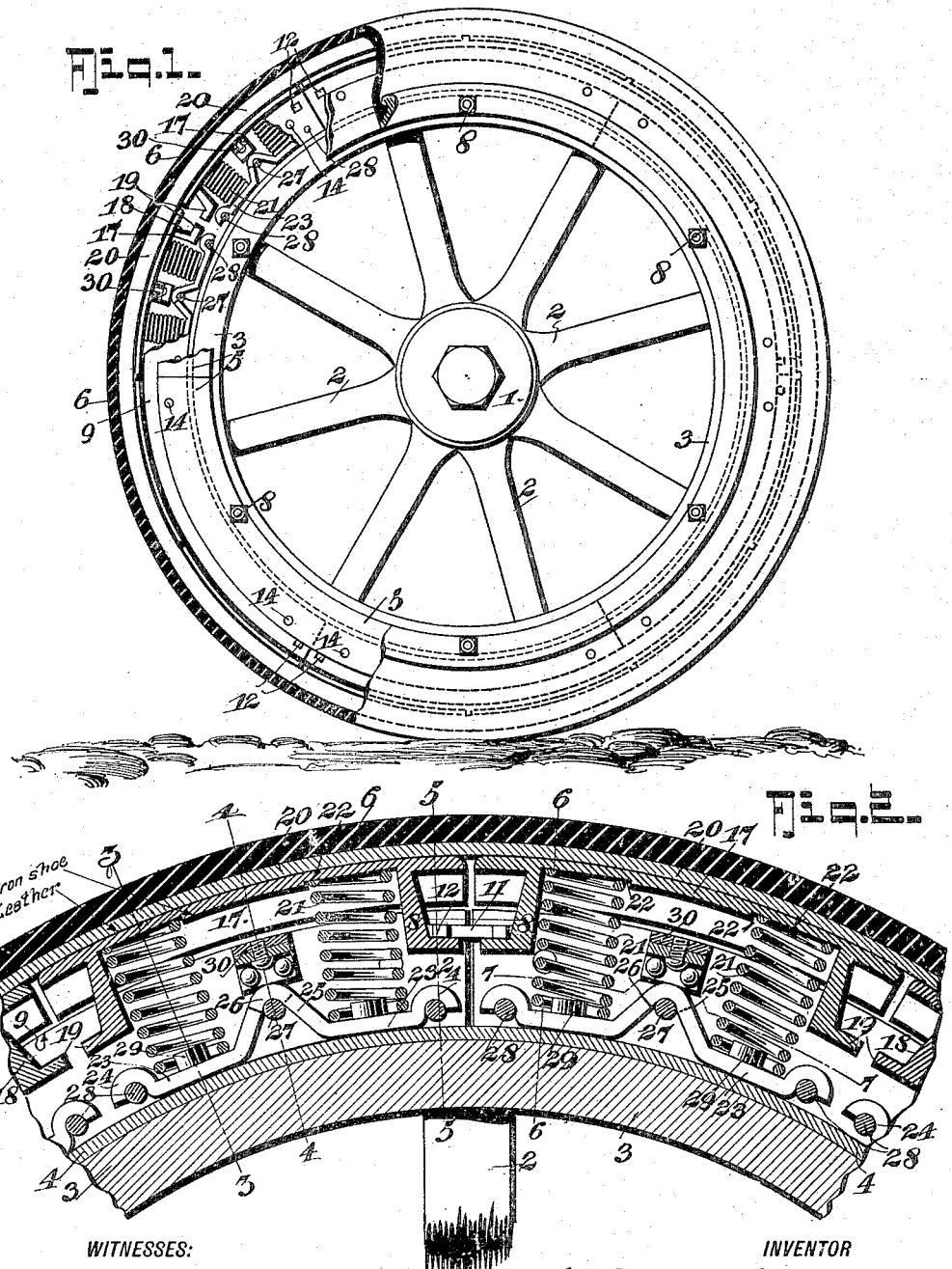

UNITED STATES PATENT OFFICE.

LE ROY B. CARRIS, OF CLAY COUNTY, IOWA.

RESILIENT WHEEL.

1,229,412. Specification of Letters Patent. Patented June 12, 1917.

Application filed March 15, 1916. Serial No. 84,459.

*To all whom it may concern:*

Be it known that I, LE ROY B. CARRIS, a citizen of the United States, and a resident of the county of Clay and State of Iowa, have invented a new and useful Improvement in Resilient Wheels, of which the following is a specification.

The invention has relation to vehicle wheels and more particularly to the tire which is made yieldable to compensate for shock, thereby adding to the comfort of the occupant of the vehicle and minimizing the wear and tear on the running gear and the motor and adjunctive parts of automobiles.

An object of the invention is the provision of a soft tread adapted to utilize any usual casing such as designed for pneumatic tires with the result that a yieldable tire is obtained possessing practically all the advantages of the pneumatic tire but which is not affected by puncture, blow-out, or rim cut.

The invention provides a tire, utilizing cushioning elements, such as helical springs, which may be readily applied to any vehicle wheel to render it resilient so as to neutralize vibration and shock, said tire embodying parts which may be easily assembled and cheaply replaced.

While the drawings show the preferred embodiment of the invention it is to be understood that in adapting the same to meet the many conditions that may arise various changes in the form, proportion and minor details of construction may be resorted to without departing from the nature of the invention.

In the drawings:—

Figure 1 is a view in elevation of a resilient wheel embodying the invention, parts of the tire being broken away to show more clearly the relation of the component elements, Fig. 2 is an enlarged longitudinal section of a portion of the tire of the wheel, Figs. 3 to 8, both inclusive, are sectional views on the respective lines indicated in Fig. 2, Fig. 9 is a detail perspective view of the coupling for connecting adjacent ring sections, and Fig. 10 is a perspective view of one of the shoes.

Corresponding and like parts are referred to in the following description and indicated in all the views of the drawings by the same reference characters.

The wheel illustrated is of ordinary construction such as designed for vehicles, and comprises a hub 1, spokes 2, and felly 3. The felly 3 is provided with the usual reinforcing and strengthening band 4. Rings 5 are secured against opposite sides of the felly 3 and project outwardly beyond the felly band 4. The edge portions of a casing 6 are clamped against the outer faces of the rings 5 by means of clamp rings 7, the latter being of the usual clencher type to engage the beads along the edges of the casing. The clamp rings 7 and rings 5 are secured to the felly by means of bolts or like fastenings 8, which pass through registering openings formed in the felly 3, and rings 5 and 7. The clamp rings 7 are continuous, but in practice it is desirable to provide the rings 5 in sections.

Other rings 9 are disposed in parallel relation with their faces adjacent or in contact with the inner faces of the rings 5. The rings 9 are disposed so as to encircle edge portions of the felly band 4 and their outer edges project beyond the outer edges of the rings 5. The rings 9 are likewise of sectional formation and the sections of the several rings 5 and 9 are disposed so as to break joint. Suitable means are employed for connecting the sections comprising the rings 9 and other means are provided for connecting the sections of the rings 9 with the sections forming the rings 5.

The sections of the rings 9 are connected by means of couplings 11, which consist of plates formed at opposite edges with lugs 12. The couplings 11 are located opposite the joints formed between adjacent sections of the rings 9 and the lugs 12 pass through openings 13 formed in the sections of the rings 9 near their extremities. As shown most clearly in Fig. 8 the coupling 11 connects adjacent ring sections and forms a tie between the ring 9 upon one side and the ring 9 upon the opposite side of the rim. The couplings 11 also serve to properly space the rings 9 and prevent binding of the parts of the shoes extending between such rings.

To maintain the rings 5 and 9 and the sections thereof in predetermined position interlocking means are provided between such parts. These interlocking means consist of studs 14, which are preferably secured to the sections of the rings 9 and project outwardly therefrom and into openings 15 formed in the sections comprising the felly rings 5. This arrangement is preferred, since it enables the parts to be more readily assembled or dismembered as may be required. In order to brace the bridges 11, the outer edges of the rings 5 are formed with inward extensions 16 at the lugs 12 of the bridges, which engage beneath the said lugs as shown in Fig. 5.

A plurality of shoes 17 are disposed adjacent the tread of the wheel and such shoes are spaced apart a proper distance at their opposing ends to admit of a limited radial movement to compensate for a yield in the tire to allow for shock and vibration. The shoes 17 are of like formation and are preferably constructed of metal. Projections 18 extend inwardly from the shoes 17 near their extremities and such projections are formed at their inner ends with longitudinally disposed lateral lugs 19. The projections 18 and lugs 19 have their faces flush and disposed to engage with the inner faces of the rings 9, the latter acting in the capacity of guards to maintain the shoes in given position against lateral displacement. The outer faces of the shoes 17 are transversely curved to conform to the transverse curvature of the tread portion of the tire. A lining 20 is interposed between the shoes 17 and the casing and such lining may be of leather or like pliable material and is designed to form an interposed cushion between the shoe and casing and to extend across the spaces formed between the terminals of adjacent shoes so as to prevent injury to the casing.

Cushioning devices 21 are interposed between the shoes and felly of the wheel and such cushioning devices preferably consist of radially disposed helical springs. The outer ends of the springs 21 engage the inner faces of the shoes 17 adjacent the projections 18 and to maintain such springs in given position recesses 22 are formed in the inner faces of the shoes and constitute seats which receive the outer ends of the springs. The projections 18 also serve as means to prevent displacement of the springs 21. The inner ends of the springs 21 engage chairs 23, which consist of plates arranged close to or in contact with the felly band 4. The chairs 23 are of like formation and each is provided at one end with a hook 24 and at its opposite end with an oblique extension 25, terminating in a hook 26. Each of the shoes 17 is provided with two cushioning springs 21 and with two chairs 23. The chairs for the springs of each of the shoes are oppositely disposed, that is, arranged with the hooked ends 24 facing outward and the hooked extensions 25 facing inward with their hooks 26 overlapping so as to engage over a pin 27 common to the pair of chairs. The hooks 24 engage over pins 28. It is observed that three pins are provided for each pair of chairs 23. The intermediate pins 27 are set outwardly from the center of the wheel a greater distance than the pins 28. The pins 27 and 28 are of like formation and their terminal portions are reduced and let into openings formed in the guard rings 9 as indicated most clearly in Figs. 4 and 5. Studs 29 are provided upon the chairs 23 and enter the inner ends of the springs 21 and serve to prevent displacement of such springs and to hold them in given position.

The guard rings 9 are connected at regular intervals by means of cross pieces 30. The cross pieces 30 are preferably of sectional formation, each of the sections being the duplicate of the other and of angle formation. The sections comprising the cross pieces 30 are arranged with their horizontal portions overlapping and connected by means of screws or like fastenings. The outer portions of the sections are placed against the inner faces of the rings 9 near the outer edges thereof and are secured thereto by means of rivets or like fastenings. By having the cross pieces 30 formed of sections which are adapted to be detachably connected the rings 9 may be readily placed in position or easily removed as required. The cross pieces 30 are located between the springs provided for each of the shoes and are disposed opposite or in line with the pins 27.

When the parts are properly assembled the couplings 11 are disposed opposite and in line with joints formed between adjacent shoes 17 and come between the inwardly extending projections 18 and exterior to the lateral lugs 19. This is indicated most clearly in Fig. 2. This disposition of the parts admits of the tread portion of the tire yielding under stress without interference of the couplings 11 with the free movement thereof.

It will be understood from the foregoing taken in connection with the accompanying drawings that the invention is of such a nature as to enable its ready application to vehicle wheels of any construction or make, and furthermore provides for the utilization of worn pneumatic casings, since the latter are not required to sustain any internal pressure and merely subserve the purpose of a protector to house the cushioning devices and the parts coöperating therewith.

The projections 18 and lugs 19 of the shoes engaging between the rings 9 guide the shoes with respect to the wheel in the plane of the wheel, and the said lugs 19 by their engagement with the bridges 11 serve to limit the outward movement of the shoes.

I claim:—

1. In a resilient wheel embodying a felly, shoes encircling the felly and spaced therefrom, helical springs interposed between the felly and shoes, chairs for receiving the inner ends of the springs, such chairs being disposed in pairs and the chairs of each pair having hooks at their outer ends and obliquely disposed hooked extensions at their inner ends, the hooked portions of such oblique extensions overlapping, and transverse supporting members engaging the hooked ends of the chairs for retaining them in place.

2. In a resilient wheel embodying a felly, side rings, transversely disposed pins supported by means of the side rings, shoes, radially disposed helical springs forming cushioning means for the shoes, and chairs for the inner ends of the springs, such chairs being provided in pairs and each pair of chairs having hooks at their outer ends to engage over certain transverse pins and provided at their inner ends with obliquely disposed hooked extensions having their hooked portions overlapped and engaging over the other transverse pins.

3. In a resilient wheel, sectional side rings, cushioning means disposed between the side rings, shoes yieldably supported by the cushioning means, and couplings arranged between the side rings and connecting the ends of adjacent sections of the side rings, such coupling means also acting as spacers and provided at their opposite edges with lugs to engage the contiguous ends of adjacent ring sections.

4. In a resilient wheel embodying a felly, side rings projecting beyond the felly, shoes, a pair of helical springs disposed radially between each of the shoes and felly, a pair of chairs for the springs of each of the shoes, such chairs having their outer ends hooked and their inner ends formed with oblique hooked extensions having their hooked portions overlapped, pins supported in the rings and engaging the outer hooks of each pair of chairs, an intermediate pin supported by the rings and engaging the overlapped ends of the hooked extensions of the chairs, and transversely disposed connecting means between the rings arranged between the springs and opposite the overlapped hooked ends of the said chairs.

LE ROY B. CARRIS.

Copies of this patent may be obtained for five cents each, by addressing the "Commissioner of Patents, Washington, D. C."